Nov. 6, 1962  T. J. MESH  3,062,994
ELECTRONIC LEVEL SENSING SERVOSYSTEM
Filed Jan. 19, 1960  3 Sheets-Sheet 1

INVENTOR
THEODORE J. MESH

BY Chapin & Neal
ATTORNEYS

Nov. 6, 1962    T. J. MESH    3,062,994
ELECTRONIC LEVEL SENSING SERVOSYSTEM
Filed Jan. 19, 1960    3 Sheets-Sheet 2

INVENTOR
THEODORE J. MESH

BY Chapin & Neal

ATTORNEYS

Nov. 6, 1962 T. J. MESH 3,062,994
ELECTRONIC LEVEL SENSING SERVOSYSTEM
Filed Jan. 19, 1960 3 Sheets-Sheet 3

INVENTOR.
THEODORE J. MESH
BY Chapin & Neal
ATTORNEYS

United States Patent Office 3,062,994
Patented Nov. 6, 1962

3,062,994
ELECTRONIC LEVEL SENSING SERVOSYSTEM
Theodore J. Mesh, Easthampton, Mass., assignor to Gilbert & Barker Manufacturing Company, West Springfield, Mass., a corporation of Massachusetts
Filed Jan. 19, 1960, Ser. No. 3,461
22 Claims. (Cl. 318—31)

The present invention relates to improvement in liquid level sensing equipment.

While this invention has broad utility in many fields, it was stimulated by the need for more economical means for measuring liquid levels with the accuracy of electronic level sensing apparatus. More particularly in the oil industry, it is necessary for reasons such as inventory control, to know the amount of petroleum product in large storage tanks which in turn necessitates knowing the amount, if any, of water in the tank. In the past, it has been accepted practice to measure the height of product in the tank and the height of water which has settled to the bottom of the tank. With a known tank diameter, it is then a straightforward proposition to calculate or calibrate from the height readings the volume of petroleum products. The same holds true for underground caverns wherein product height has been calibrated for the volume of an irregularly shaped storage chamber.

There is a further problem in accurately determining volume in this manner which stems from the fact that the diameter of the storage tanks is often very large, in the range of 200 feet or more. This means that an error in height measurement of half an inch would result in a volume error of over 10,000 gallons. This problem has been minimized to tolerable limits by the development of electronic level sensing equipment having an accuracy of ± 1/64 inch. Such electronic apparatus, to complete the picture, has been developed to measure the level of the petroleum products while other apparatus has been developed to measure the height of the interface between the petroleum product and the water therebeneath, the two liquids being immiscible. Thus there has been a duplication of components involved since each level sensing apparatus comprised electronic signal generating means, a sensing element, adapted one to follow the product level and the other to follow the interface level and separate servo controls for each sensing element.

The object of the present invention is to reduce the expense and simplify electronic level sensing apparatus capable of measuring the height of liquid in a container as well as the height of an immiscible liquid at the bottom of the container.

Another object of the invention is to provide improved means for determining the amount of a given liquid in a container by measuring the heights of the upper and lower surfaces of the liquid.

A further object is to overcome a lack of measuring sensitivity where there is a high humidity atmosphere overlying the upper surface of the liquid.

The characteristic feature of the invention is a level sensing probe in combination with selective means for causing the probe to seek and follow either the upper surface of a body of liquid in a container or the lower surface of the liquid. In following the lower surface of the liquid, it is immaterial to the sensing probe whether there is a body of immiscible liquid defining the bottom of the lower surface or whether the container bottom defines the lower surface.

The above and other related objects and features of the invention will be apparent from a reading of the following description of the invention illustrated by the accompanying drawing. The novelty thereof will be pointed out in the appended claims.

Figure 1:
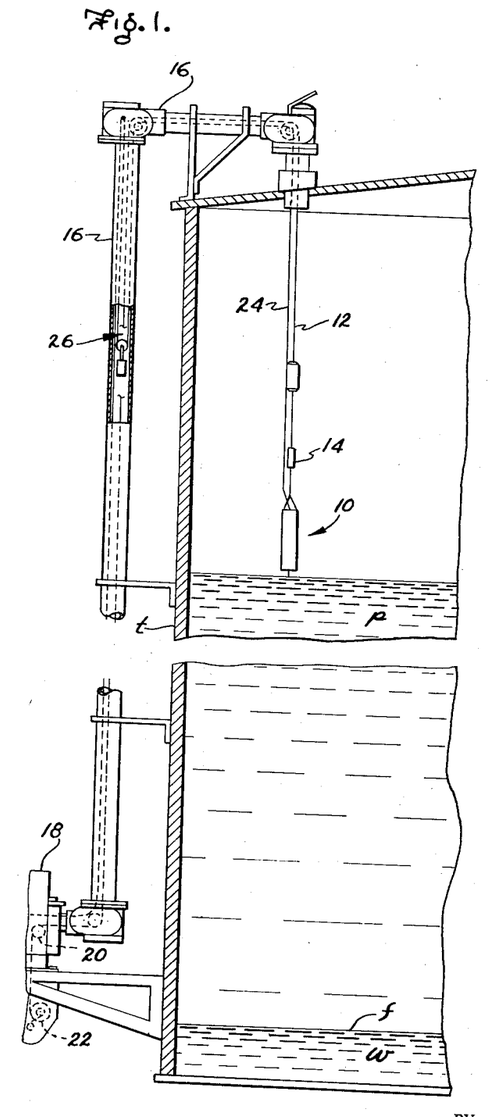
FIG. 1 is an elevation, with portions broken away and in section, of a storage tank on which the present level sensing apparatus is mounted.

Referring now to the drawings, FIG. 1 shows a typical installation of the present electronic level sensing apparatus in a large storage tank $t$ for petroleum products $p$. The tank $t$ is circular in outline and is covered over to prevent contamination of the liquid product $p$. To indicate the usual condition in storage tanks, a body of water $w$ is shown beneath the product $p$. Since petroleum products such as fuel oil are immiscible with water, a definite interface $f$ is found between the two bodies of liquid.

The electronic level sensing apparatus now to be described, is adapted to measure the height of the upper surface of the product $p$ as well as the height of its lower surface at the interface $f$. With these measurements and with a known tank diameter, the volume of product $p$ may be readily determined. Such measurements serve other purpose as, for example, to provide an indication for the need of draining off the water $w$ so that it won't become mixed with the product $p$ when drawn from an outlet (not shown) adjacent the lower end of the tank.

A level sensing element or probe 10 is seen in FIG. 1 in predetermined relation relative to the upper surface of the product $p$. The probe 10 is suspended from a perforated metal tape 12 and electrically dissociated therefrom by an insulator 14 with an appropriate counterweight also being provided. The tape 12 is trained above the tank cover outwardly of the tank $t$ and extends to the base of the tank, with a composite conduit 16 being provided to protect the tape and support mounting means for pulleys which guide the tape. A housing 18 is disposed at the lower end of the conduit 16 and houses a servomotor (not seen in FIG. 1) which drives a pin wheel 20 engaged with the perforated tape 12. Rotation of the pin wheel 20 causes vertical movement of the probe 10 as the tape 12 is wound or unwound from a takeup wheel 22.

The probe 10 is electrically connected to electronic control circuitry within the housing 18 by means of a coaxial cable 24. The cable 24 is connected at one end to the probe and extends through the conduit 16 to the housing 18. The other end of the cable 24 is fixed relative to the housing 18 and a takeup loop indicated at 26 is provided within the vertical portion of the conduit 16 to accommodate height variations of the probe 10.

In one manner of use the present apparatus follows the teachings of the Patent No. 2,682,026 in that an electronic signal is generated by the circuitry within the housing 18 and transmitted by way of the cable 24 to the probe 10. The probe 10 is in effect tuned or resonant with the transmitted signal after the fashion of a quarter wave antenna. Therefore, the strength of the signal developed on the probe is dependent upon its positional relationship with the upper surface of the product $p$. Means are provided for transmitting a return signal, which indicates the strength of the signal on the probe 10, back to the electronic circuitry in the housing 18. The strength of the return signal will vary from a maximum to a minimum value dependent on its contactual relation with the surface of the product p. When the strength of the return signal is at some intermediate level, the servomotor which is controlled thereby will be at rest and the probe in predetermined contactual or positional relation with the surface of the product p. This contactual relation will, of course, be varied by the addition or withdrawal of product p, and such variation will cause the strength of the return signal to vary from said intermediate value in turn causing the servomotor to drive the pin wheel in the desired direction to restore the probe to said predetermined contactual relation with the product p.

The height of the upper surface of the product p is thus at all times reflected as a function of the angular position of the shaft of the servomotor, which angular position may be translated to a direct dial reading at the base of the tank t or may be transmitted by telemetric means to a remote control station and then translated by digital or analogue means to reflect either the height of the upper surface of the product p or a volume reading.

Figure 2:
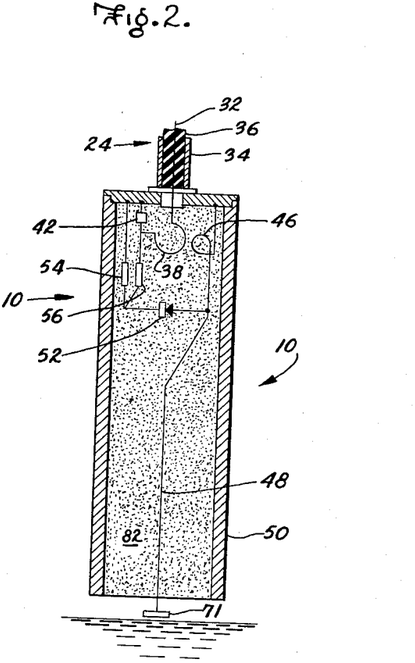
FIG. 2 is a cross-sectional showing of the level sensing probe employed herein positioned above the body of petroleum product seen in FIG. 1.
Figures 5, 6:
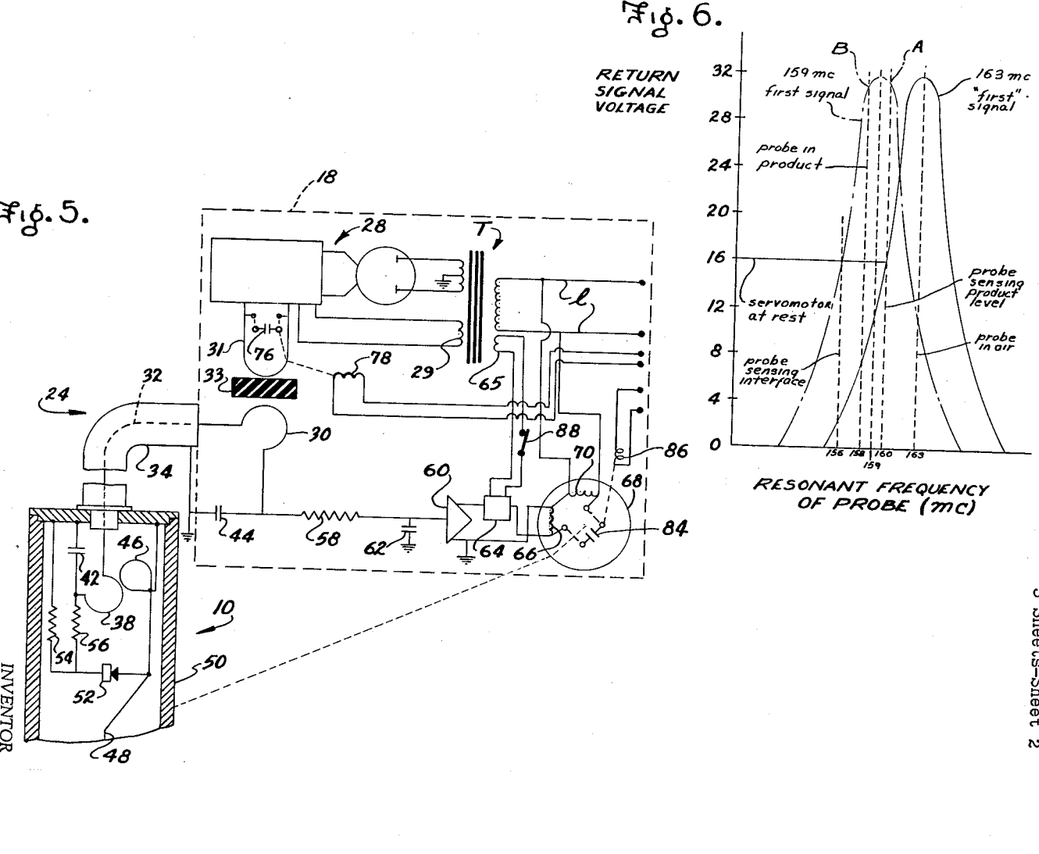
FIG. 5 is a diagrammatical showing of the electronic circuit employed.
FIG. 6 is a chart showing the relation of voltage and signal frequencies as pertain to the circuit of FIG. 5.

The signal transmitting means of the present embodiment closely follows the disclosure in my co-pending application, Serial No. 722,002, filed March 17, 1958, now Patent No. 2,968,753, and may best be understood by reference to FIGS. 2 and 5 which show the signal circuits and the constructional details of the probe 10. An oscillator 28 (FIG. 5) is provided within the housing 18 for generating a high frequency first signal which, for example, may be set at 163 mc. The oscillator 28 is powered from a transformer T which also is provided with a coil 29 used in modulating the 163 mc. signal with a 60 cycle signal. The oscillator 28 includes in its tank circuit an inductance loop 31, on which the modulated first signal is developed. This signal is coupled to a loop 30 through an insulator 33 and then transmitted by the inner conductor 32 of the coaxial cable 24 to the probe 10. The coaxial cable 24 preferably comprises in addition to the inner conductor 32, an outer conductor 34 and a coaxial polytetrafluoroethylene dielectric spacing element 36. (FIG. 2)

The high frequency modulated signal is transmitted to a coupling loop 38 within the upper end of the probe 10. The high frequency circuit is completed from the loop 38 back to ground by way of a condenser 42 which is connected to the outer metallic shell of the probe 10 and the grounded outer cable conductor 34. The other side of the high frequency circuit is completed back to ground by way of condenser 44 connecting the loop 30 to the grounded casing 18.

The high frequency modulated signal is coupled from the loop 38 to a loop 46 which transmits the signal to a resonant tuned wire 48 which is encircled by a metal shield 50 which defines the outer surface of the probe 10. The wire 48 is in effect a shielded antenna and is of such a length that it is electrically, a quarter wave length of the high frequency 163 mc. signal so that when the probe 10 is out of contact with the product p, the wire 48 is tuned to or in resonance with the 163 mc. signal and a maximum signal in the nature of a standing wave will be developed on the wire 48. As will later appear, the wire 48 projects beyond the shield 50 and is detuned by contact with the product p. In any event, the 60 cycle component of the standing wave or second signal developed on the wire 48 is passed by a detector in the form of a semi-conductor 52 (FIG. 5). The component passed by the detector 52 is for convenience referred to as the return signal.

The return signal circuit includes a load resistor 54 of relatively high resistance for the semi-conductor 52 and a blocking resistor 56 of relatively low resistance. At this point, it will be noted that the resistor 56 is provided to block or isolate the high frequency, modulated first signal from the detector 52. However, the resistor 56 provides slight impedance to the lower frequency of the return signal. By the same token, the condenser 42 provides a high impedance to the lower frequency return signal so that it is blocked from the ground at this point and instead is transmitted along the inner conductor 32 of the cable 24 back to the housing 18. The low frequency return signal then passes beyond the loop 30 through a blocking resistor 58 (FIG. 5) to a preamplifier 60. The blocking resistor 58 is similar in function to the resistor 56 in that it isolates the high frequency first modulated signal from the return signal and permits the latter to pass to the preamplifier. The condenser 44 while completing the high frequency circuit, provides a relatively high impedance to the 60 cycle return signal preventing it from being shorted to ground at this point. A further condenser 62 is provided between the blocking resistor 58 and the preamplifier 60 to short to ground any high frequency stray signals which might be picked up.

After the return signal is fed to the preamplifier, it passes to what may best be referred to as a comparator (indicated at 64) which is included in the output circuit of the preamplifier. The comparator comprises a reference voltage derived from a secondary of transformer T and 180° out of phase with the return signal. With a maximum return signal, a resultant control signal will be passed by the comparator having the same phase relationship as the return signal. This control signal is then impressed, with or without further amplification, on one winding 66 of the two-phase induction servomotor indicated diagrammatically at 68. The other winding 70 of the servomotor is electrically 90° out of phase with the first winding and connected to a power source such as the lines l connected to the primary of the transformer T.

Under the described conditions with the probe 10 in air, the servomotor 68 will rotate in the proper direction to lower the probe 10 and bring it into predetermined contactual relationship with the upper surface of the product p (FIG. 3), thereby detuning the wire 48 and causing a reduction in the strength of the return signal. When the return signal fed to the comparator equals the strength of the reference signal, then no current will be applied across the coil 66 of the motor 68 and rotation of the motor will stop. If the wire 48 is further detuned by a rise in the level of the product p, then the return signal will be further decreased and the resultant signal from the comparator 64 will have the phase relationship of the reference signal thus causing rotation of the servomotor in the opposite direction to raise the probe 10 and again restore the desired contactual relationship with the surface of the product p. As thus far described, the apparatus follows the teachings in the above-mentioned Patent No. 2,682,026 and Patent No. 2,968,753.

In accordance with the present invention, means are provided for employing the same element 10 to determine not only height of the upper surface of the product p but also the height of its lower surface or the height of the interface f (FIG. 1). As a preliminary to explaining the manner in which this end is attained, reference is next had to FIG. 6 which shows an exemplary plot of the return signal voltage (as it is fed to the comparator 64) against the resonant frequency of the probe which is shown by the solid line curve for a 163 mc. first signal from the oscillator 28. It will be noted that with a 163 mc. signal generated by the oscillator 28, return signal voltage is at a maximum when the probe is tuned or resonant at 163 mc. This condition exists when the probe is out of contact with the product p. When the wire 48 (or the metal disk 71 discussed below) approaches and is brought into contact with the product p, its electrical properties are altered, and it is detuned so that its resonant frequency becomes somewhat less than 163 mc. and the strength of the return signal is decreased. When the probe is detuned to 160 mc. for example, the strength of the return signal is 16 volts and equals the strength of the reference signal in the comparator 64. Consequently there is no resultant voltage fed from the comparator 64 to the coil 66 and the servomotor 68 is at rest as the predetermined contactual relationship with the product is established.

Figure 3:
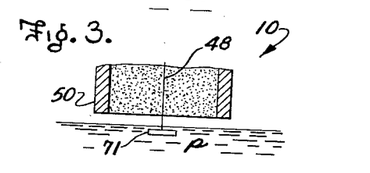
FIG. 3 is a fragmentary section of the lower end of the probe in its product sensing position.

At this point it will be noted that a small metal disk 71 has been attached to the lower end of the wire 48. For illustrative purposes the dimensional relationships involved will be given. The metal disk is .25" in diameter and 1/16" in height. The bottom of the metal disk is spaced 5/8" from the bottom of the shield 50. The use of a metal disk increases the sensitivity of the probe 10. That is, the wire 48 is tuned and detuned to a greater extent by small changes in its relative position to the product $p$. The predetermined contactual relation with the product $p$ is established when the lower surface of the disk 71 is spaced 1/4" beneath the upper surface of the product $p$ (FIG. 3).

With these conditions and relationships established, the probe 10 is caused to seek the level of the lower surface of the product $p$ or the interface $f$ by changing the frequency of the oscillator 28. A simple method in which this may be effected is to provide additional capacitance in the tank circuit of the oscillator. This is illustrated in FIG. 5 by a condenser 76 which is controlled by a relay 78. When the relay 78 is energized, condenser 76 is connected across the loop 31 of the oscillator 28. The leads from relay 78 are indicated as extending to a terminal strip within the housing 18 from where they would be connected to an actuating switch at the remote control station where it is usual practice to take readings from several different storage tanks. It would of course be possibe to provide a switch at the housing 18 so that the relay 78 could be energized from that point.

The output of the oscillator is instantaneously changed to a lower frequency and the probe 10 is automatically lowered into the product $p$. This condition is best appreciated from the dash-dot curve in FIG. 6. It will be seen that with the probe in its product sensing position (FIG. 3), its resonant frequency is 160 mc. when the frequency shift is made. The 159 mc. voltage curve shows that with a resonant probe frequency of 160 mc., the return signal (indicated at point A) will be 31.5 volts. Thus a strong signal, having the phase of the return signal, will be fed to coil 66 of the servomotor and it will rotate to lower the probe into the product. As the probe is immersed in the product, its resonant frequency will be further lowered to 158 mc. As this occurs the strength of the return signal is raised to 32 volts and then decreases to 31.5 volts (indicated at point B in FIG. 6). In any event the servomotor 68 continues to rotate in a direction to lower the probe 10 through the product $p$ towards the interface $f$.

Preferably the change in resonant frequency of the probe from 160 mc. to 158 mc. is quickly attained during the downward movement of the probe. Thus it will be noted that the probe 10 is completely filled with a dielectric material 82 (FIG. 2) down to the extreme lower end of the outer shell or casing 50 and that only a small portion of the wire 48 and its disk 71 are exposed. Once the exposed portion of the wire 48 is fully immersed in the product $p$, a distance of only 3/8" being required, the resonant frequency of the probe becomes 158 mc. and remains constant at this figure until the probe approaches the interface $f$. Referring back to the dielectric material 82, it has been found preferable to use a thermosetting casting resin, such as an epoxy, and to load the resin with small hollow glass beads. In any event the interior of the probe is sealed off so that no variant condition is created by allowing the interior of the probe to become coated with product.

Figure 4:
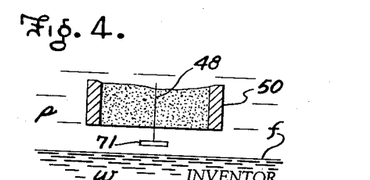
FIG. 4 is a fragmentary view of the probe in its interface sensing position.

As the probe 10 continues downwardly through the product, it will approach the interface $f$ and as it approaches the interface $f$, a capacitance will be created between the disk 71 and the interface. This capacitance further detunes the probe and decreases the strength of the return signal. When the probe is detuned to 156 mc. or when the strength of the return signal is 16 volts, the return signal will again balance the reference signal at the comparator 64 (FIG. 5) and the servomotor will stop. It has been found that this occurs (FIG. 4) with the probe 10 in fixed relationship to the interface $f$. More specifically it has been found that this occurs when the bottom of the disk 71 is spaced above the interface $f$ a distance of 1/4". It will be noted that with the probe spaced above the interface when sensing its height, a further advantage is gained in that the probe will not become fouled by scum which often accumulates at the interface. It will also be pointed out that the repeatability of the probe in either its product sensing position (FIG. 3) or in its interface sensing position (FIG. 4) is ±1/64".

As was stated above, the angular position of the servomotor reflects the height of the upper surface of the product $p$ and the same holds true for the height of the interface $f$, it being a simple matter to account for the fixed space of 1/4" of the probe above the interface so that the direct height or volume readings may be made at the remote control station.

It has also been found that the described arrangement is equally effective in determining the height of the lower surface of the product $p$ when there is no interface. This is to say that if there were no water in the tank $t$, the probe 10 with the 159 mc. first signal would space itself 1/4" above the bottom of the tank which would indicate at least a substantially complete absence of water in the tank.

In carrying out the present invention, some care must be exercised in lowering the frequency of the first signal from the oscillator 28. It will be noted that when shifting from 163 mc. to 159 mc., the resonant frequency of the probe is assumed to be 160 mc., that is its frequency when sensing product level (FIG. 6). This means that after the frequency shift, the return signal voltage will be substantially greater than 16 volts and preferably will be at or near maximum signal strength when the probe is fully immersed, thereby causing the servomotor to be driven at a relatively high rate. If the frequency shift were such that the probe were substantially detuned from the frequency of the first signal after it had been shifted to a lower value, then the probe would be raised by the servomotor and the purposes of the present invention defeated. This is illustrated in FIG. 6 where it will be seen that if the probe were in air when the first signal is shifted to 159 mc., that with a resonant probe frequency of 163 mc., the strength of the return signal would be less than 16 volts which in turn would mean that the resultant voltage from the comparator 64 (FIG. 5) would have the phase relation of the reference signal and the servomotor would be driven to raise the probe 10 rather than to lower it.

It will be pointed out that the frequency of the first signal need not be necessarily shifted instantaneously but could be shifted gradually as by the use of a variable condenser in the tank circuit of the oscillator 28. Also it might be advantageous under certain circumstances to shift the frequency of the first signal in increments in order to obtain the highest possible rate of operation of the servomotor. Thus for example, the frequency of the first signal could be shifted to 160 mc., which would yield a peak return signal voltage with the probe having a resonant frequency of 160 mc., that being the condition when sensing product level. Immediately upon the probe becoming fully immersed in product and detuned to 158 mc., the first signal could then be shifted to 158 mc. This would give maximum return signal voltage in driving the servomotor to lower it through the product $p$ to the interface $f$ at the highest possible rate.

Once a reading has been made of the height of the interface $f$, then the usual procedure would be to shift the frequency of the first signal back to 163 mc. This is done in the present instance by de-energizing the relay coil 78 from the remote control station to disconnect the capacitor 76 from the tank circuit of the oscillator 28. The frequency of the oscillator instantaneously reverts to 163 mc. It will be seen that when this instantaneous shift is made, the resonant frequency of the probe is 156 mc. The strength of the return signal is substantially less than the strength of the reference signal at the comparator 64 so that the servomotor is driven to raise the probe back toward the upper surface of the product. When the probe physically assumes the position shown in FIG. 3, its resonant frequency will be 160 mc. The strength of the return signal will be 16 volts and operation of the servomotor will be halted. The probe is then free to follow changes in the height of the product as above described.

Certain problems are encountered when the present apparatus is used in a closed tank or container wherein the humidity of the atmosphere above the product is very high and approaches 100%. Such conditions for example are found in underground storage caverns for petroleum products. Under these high humidity conditions, moisture will very quickly collect on the probe and particularly the exposed surface of the dielectric 82. The effect of this moisture has been found to be primarily in the nature of a pure resistance to the inductance-capacitance values of the probe, these being the values which govern the Q of the probe and the development of standing wave thereon from which the return signal is derived. The resistance value, attributable to the water condensate, lowers the Q of the probe itself. Thus instead of a sharply peaked voltage curve as seen in FIG. 6, there would be a relatively flat curve wherein incremental changes in the resonant frequency of the probe would yield much smaller incremental changes in the return signal and the maximum return signal when the probe is in air would be say 20 volts instead of 32 volts as indicated by FIG. 6. This condition creates two specific problems. One is difficulty in following changes in the level of the product and the other is in causing the probe to seek the water interface with a simple frequency shift of the first signal as above described.

Petroleum products have been found not to have this undesirable effect on the probe Q, and it is therefore preferable to maintain the probe fully immersed in the product and detecting the level of the water interface in the normal condition of the apparatus. In this position there is no opportnuity for moisture to condense on the probe and moisture will in fact be "washed" off the probe by the product. For such purposes the condenser 76 is normally connected across the inductance loop 31 to provide a 158 mc. first signal with the probe 10 spaced from or following the interface $f$, the 158 mc. signal being used for reasons discussed below. When it is desired to take a reading of the height of the product level, the capacitor 76 is removed from the oscillator tank circuit as by deenergizing the relay coil 78 and the oscillator frequency shifts to 163 mc. An accurate reading may then be taken of the level of the product in the fashion above described, but even so moisture will immediately begin to condense on the probe thereby tending to lower its Q and make more difficult its return to the interface sensing position.

Two means have been found for overcoming this problem both of which are illustrated in FIG. 5. The first involves modification of the mode of operation of the servomotor by temporarily connecting a capacitor 84 across the open ends of the servomotor windings 66 and 70. The effect of this action is to convert the servomotor to a line connected capacitor motor operating independently of any signal from the comparator. When so converted, the motor 68 rotates in the proper direction to lower the probe into the product and move it towards the interface $f$. After the probe has been lowered a short distance into the product, the condensate affecting its Q is at least partially "washed" off. Once immersed in the product the resonant frequency of the probe is 158 mc. Since the Q of the probe may be still affected by condensate, it is preferable that the first signal of the oscillator be tuned to 158 mc. so that a maximum return signal be derived from the probe in order that the servo motor will operate at the fastest possible rate to return the probe to its interface sensing position. It will be apparent that the value of the condenser 76 will have to be varied somewhat in order to obtain a 158 mc. signal rather than the 159 mc. signal previously employed. It will also be apparent that the resonant frequency of the probe in its interface sensing position will be somewhat lower, say 155 mc., but in any event the probe will be spaced a fixed distance above the interface. Connecting and disconnecting of the condenser 84 may be accomplished by the use of a relay 86, the leads of which, as indicated in FIG. 5, extend to the remote control station. When the relay 86 is energized, the condenser 84 or appropriate contacts are mechanically moved to connect the condenser 84 across the open ends of the motor coils 66 and 70, and when the relay 86 is de-energized, the condenser 84 is electrically disconnected from the coils 66 and 70. Relay 78 may be energized either before or after energization of the relay 86 and relay 86 may be de-energized any time before the probe 10 reaches its interface sensing position.

The other means for accomplishing this end are also based on normally maintaining the probe in its interface sensing position and involves a temporary modification of the comparator 64. Thus a switch 88 is shown in one of the leads bringing the reference voltage from the transformer coil 65 to the comparator 64. The switch 88 may be physically located at the casing 18 or may be remotely disposed at the master control station. In any event when the switch 88 is open with the probe 10 in its upper position, there will be no reference voltage fed to the comparator means and the resultant voltage fed from the comparator to the servomotor coil 66 will be the full voltage of the return signal rather than a resultant voltage as previously described. Thus even though the Q of the probe may be substantially lowered by moisture condensate, there will be a return signal of sufficient strength to rotate the servomotor and drive the probe downwardly from its product sensing position. When the frequency of the oscillator 28 is shifted from 163 mc. to 158 mc. by energization of the relay 78, a first signal frequency of 158 mc. is preferred for the same reasons as discussed above. After the probe has been lowered a short distance into the product $p$, the circuit may be restored to its normal operation by closing the switch 88.

The values of the various electrical components are essentially the same as given in my co-pending application, Ser. No. 722,002, now Patent No. 2,968,753, and the above-mentioned Patent No. 2,682,026. However, it will be noted that the condenser 76 has a value in the order of 1.5–7.0 $\mu\mu f.$, and the relay 78 is of a type especially adapted for use with ultrahigh frequency signals. An exemplary value of condenser 84 is 1 $\mu f.$ It will be appreciated that the higher the Q of the probe the greater will be its accuracy in sensing the product level or the interface level. This can be appreciated by referring to the solid curve in FIG. 6 which illustrates a probe having a relatively high Q. Realizing that there is some "inertia" in the system, it will be appreciated that with the servomotor at rest and the amplified return signal voltage 16 volts, that very small changes in the natural frequency of the probe will not result in a sufficient change in the return signal voltage to actuate the servomotor. This results in a tolerance which reflects the variation in the probe's positional relationship with the petroleum product wherein the servomotor will remain at rest or vary in reliability. In order to increase the accuracy of this type of electronic level sensing apparatus, considerable efforts have resulted in probe constructions which have much higher Q's, that is, their frequency response curve is much more sharply peaked than shown in FIG. 6. Using these higher Q probes has made difficult the use of a reduced first signal (viz the 159 mc. signal) which is not equal to the natural resonant frequency of the probe when immersed in product.

Figure 7:
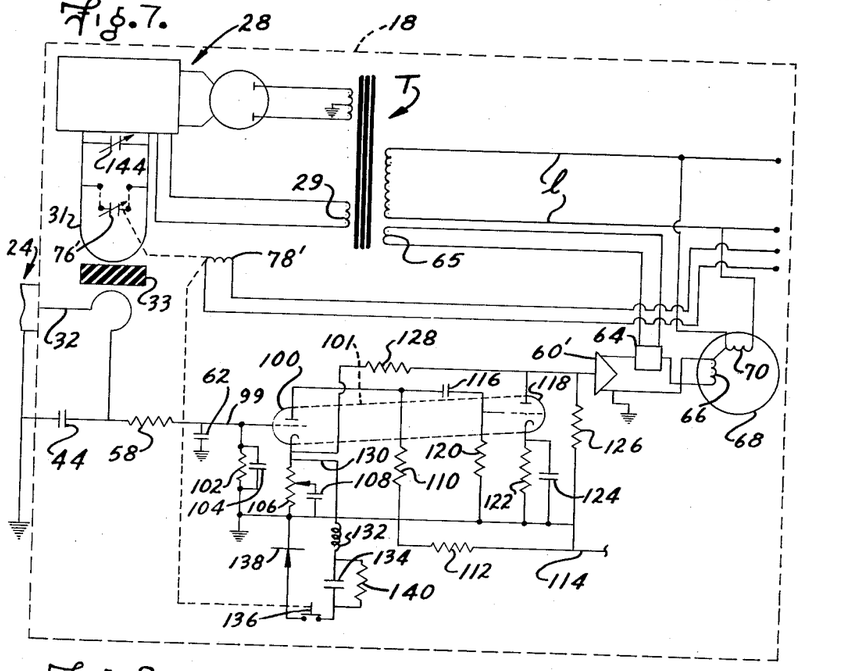
FIG. 7 is a diagrammatical showing of an alternate electronic circuit.

The circuit seen in FIG. 7 enables the use of these higher Q probes, while at the same time retaining the advantage of being able to use a single probe for sensing both product level and interface level. In this alternate circuit the first signal and return signal are transmitted to and from the probe 10 in the same manner as previously described and like reference characters are used on those components which are unchanged from the circuit of FIG. 5. The return signal is fed from the inner conductor 32 of the coaxial cable 24 for amplification to drive the servomotor 68. In the previously described circuit the amplification of the return signal was briefly indicated by a single diagrammatic amplifier 60. Actually, as was indicated and as is the case in the mentioned patent and application, several stages of amplification are preferably employed in order to get a desirable voltage signal for driving the servomotor 68.

In FIG. 7, it will be seen that the return signal is fed along wire 99 to the grid of one section 100 of a double triode tube 101. A grid return resistor 102 and an R.-F. by-pass condenser 104 connect the grid of the tube section 100 to ground. The cathode of triode section 100 is connected to ground through a bias resistor 106 and a by-pass condenser 108 having a variable connection with the resistor 106. The plate of the triode section 100 is connected to a power supply (not shown) through resistors 110 and 112 and the line 114. The plate of the triode 100 is connected by a coupling condenser 116 to the grid of the other triode section 118 of the electron tube 101. The triode section 118 provides a second stage of amplification for the return signal. The grid of triode section 118 is connected to ground through a resistor 120, while its cathode is connected to ground through a biasing resistor 122 and a by-pass condenser 124 in conventional fashion. The plate of triode section 118 is connected to the power supply through resistor 126 and line 114. The cathodes of triode sections 100 and 118 are heated in the usual manner and it is, of course, appreciated that separate triode tubes could be employed.

It will be seen that the plate of triode section 118 is connected to the cathode of the triode section 100 through a resistor 128 to provide regenerative signal feedback in a known fashion. In the normal operation of this circuit the return signal is amplified by the triode section 100 by a controlled amplification factor. That is, there is a D.C. bias provided by the D.C. voltage drop across the resistor 106 and an A.C. bias provided by a voltage drop across that portion of the resistor 106 which is not biased by the condenser 108. The A.C. bias is derived from the degenerative A.C. plate current flow through the triode section 100 and the degenerative feedback from the plate of the triode section 118. The adjustable connection with the resistor 106 provides means for adjusting the gain of the amplifier. This is a known arrangement for obtaining desirable amplification characteristics as well as providing a means for controlling the maximum amplified level of the return signal.

The amplified return signal is then coupled to the grid of the triode section 118 for further amplification. From the plate of the triode section 118 the return signal is fed to further amplification stages indicated by the reference character 60' which amplifies the return signal to the same level as the amplifier 60, previously described. This amplified return signal is then fed to the comparator 64 to control operation of the servomotor 68 in the same manner as before. Thus, with a return signal of less than 16 volts which is the strength of the reference signal of the comparator, the servomotor will rotate to raise the probe and with a return signal at the comparator or more than 16 volts the servomotor will rotate to lower the probe. Up to this point it has been presumed that the frequency of the first signal from the oscillator 28 is 163 mc. and that the resonant frequency of the probe in air is also 163 mc.

Figure 8:
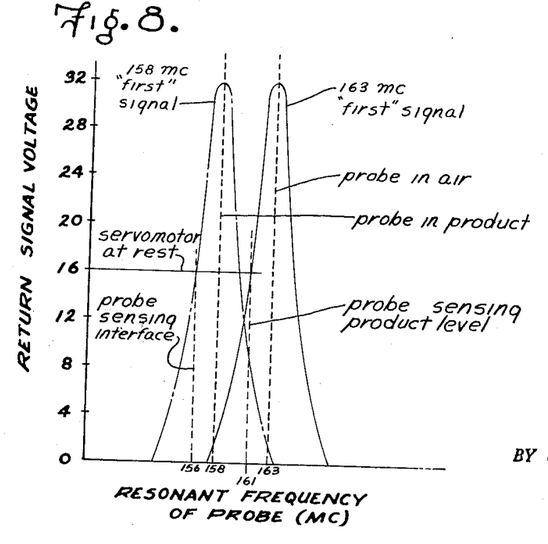
FIG. 8 is a chart showing the relation of voltage and signal frequencies as pertain to the circuit of FIG. 7.

Referring now to FIG. 8, it will be seen that with a probe having a considerably higher Q, the return signal is reduced 16 volts by detuning the probe to a natural resonance of 161 mc. as opposed to 160 mc. previously assumed for the probe when it is in its level sensing position. Thus, we are dealing with a probe which is in a product level sensing position when immersed in product to a lesser degree than before. Since the probe itself is detuned to a lesser degree when in a product sensing position, it will be apparent that, with the high Q probes smaller incremental changes of product level and resultant changes in the natural resonance of the probe are required to actuate the servometer 68. While not wholly apparent from the drawing, if the first signal were shifted as before to a frequency of 159 mc. there would be little or no return signal tending to actuate the servomotor 68 to lower the probe toward an interface sensing position.

The following means have been devised to actuate the servomotor 68 and rotate it at a maximum rate when it is desired to lower the probe to its interface sensing position. Referring back to FIG. 7, it will be seen that a line 130 extends to an R.-F. choke 132 which in turn is connected to one side of a condenser 134. The other side of the condenser is connected to switch contacts 136 which in turn are connected to a silicone junction diode or semi-conductor 138. A resistor 140 is connected in parallel across the condenser 134. This described circuitry has no effect in the normal operation of the circuit as above described in as much as at that time the switch contacts 136 are open. However, when it is desired to bring the probe to its interface sensing position a relay 78' is energized. The relay 78' does two things. First, it connects across the inductance loop 31 a variable capacitance 76'; this shifts the frequency of the first signal to 158 mc. Second, the relay 78' closes, by the indicated mechanical connection, the switch contacts 136. The effect of closing the switch contacts 136 is to remove all degenerative A.C. feed back from the triode section 100 so that it will amplify the return signal with a maximum amplification factor, several times that the amplification normally obtained with degenerative feed back. Because of the timing feature in this circuit, the degenerative feed back is removed and maximum amplification is obtained for a relatively short time sufficient to fully immerse the probe wire 48 in the product p; a short distance of about ¼". Once the exposed portion of wire 48 is fully immersed in product, its resonant frequency is stable at 158 mc. Thereafter, the amplification of triode section 100 automatically reverts to its usual level and the circuit operates to lower the probe 10 until its interface sensing position is reached. The relationship of the reduced "first" signal and resonant probe frequency under these conditions is seen in FIG. 8.

In greater detail, it will be seen that the circuit comprising the condenser 134 and semi-conductor 138 by-passes the cathode biasing resistor 106. The degenerative A.C. signal current will follow this preferred by-passing circuit so long as a direct current is flowing through the semi-conductor 138. The direct current flowing through the semi-conductor 138 comes from the adjacent plate of the condenser 134 which, when the switch contacts 136 are open, has the same positive charge as the cathode of triode section 100 by reason of the connection made by the resistor 140. When the switch contacts 136 close, this charge flows as a direct current of several milliamps through the semi-conductor 138. With a substantial direct current flow through the semi-conductor 138, its resistance is very small both to A.C. and D.C. current. After a relatively long period of time in the order of perhaps 25 seconds, the direct current flow from the condenser 134 is reduced to an extent where the resistance of the semi-conductor 138 increases very materially to a fairly well defined cut-off point; this being a characteristic of such semi-conductors that their resistance is inversely proportional to current flow. The semi-conductor 138 now effectively blocks any further substantial A.C. or D.C. current flow. In this connection it will be noted that the voltage on condenser 134 is in the order of 2 volts when the switch contacts 136 are closed. This voltage is sufficient to cause a current flow which reduces the resistance of the semi-conductor to a very low level, as explained above. However, the degenerative voltage is in the order of .2 volt. This voltage is below the "cutoff point" for the semi-conductor 138 so that it presents such a high resistance to current flow that it does not act as a rectifier. Thus, the degenerative feed back for the triode section 100 retains its characteristic wave form when the "cutoff point" for the semi-conductor 138 is reached after draining a given amount of current from the condenser 134.

With the automatic time-delay system thus provided, it will be seen that with energization of the relay 78', the first signal is shifted from 163 mc. to 158 mc. (FIG. 8) and simultaneously the return signal is amplified by a factor several times greater than normal as the degenerative feedback is removed from the triode section 100 for a predetermined time, which is sufficient for the probe to be lowered so that wire 48 is wholly immersed in the petroleum product. It will be apparent from FIG. 8 that with the probe in its product sensing position, the servomotor would raise the probe with normal amplification. This undesired result is obviated by the increased amplification obtained by the described means for removing degenerative feedback. With the time-delay feature of the circuit, the triode section 100 is automatically returned to normal amplification when the "first" signal is resonant with the natural resonant frequency of the immersed probe and therefore a maximum return signal is available for rotating the servomotor 68 to lower the probe to its interface sensing position in a minimum of time (FIG. 8). The probe senses the interface in the same fashion as above described, being further detuned to 156 mc. When it is desired to return from the interface sensing position back to product sensing position it is necessary simply to de-energize the relay 78'. The return signal is amplified in the same manner as before to cause the probe to move upwardly and the only effect of opening switch contacts 136 is to equalize the charge on both sides of the condenser 134 through the resistor 140.

The values of the electrical components described in connection with obtaining temporarily increased amplification in the tube are given as follows, purely for exemplary purposes:

| | |
|---|---|
| 100 } | 12AT7 |
| 118 } | |
| 102 | 270 K ohms. |
| 104 | 100 μμf. |
| 106 | 10 K. |
| 108 | 50 μf. |
| 110 | 470 K ohms. |
| 112 | 22 K ohms. |
| 116 | .1 μf. |
| 120 | 1 megohm. |
| 122 | 2700 ohms. |
| 124 | 50 μf. |
| 126 | 100 K ohms. |
| 128 | 1 megohm. |
| 132 | .8 μf. |
| 134 | 50 μf. |
| 135 | 470 K ohms. |

It will be appreciated that the above-described circuit provides a unique time delay means which is dependent, at least in part, upon the value of the condenser 134 and that this time delay could be increased by increasing the capacitance of the condenser or conversely by decreasing the capacitance thereof.

It will now be noted that a variable tuning capacitor 144 is provided across the inductance loop 31 and also that the detuning capacitor 76' is variable. While exact frequencies have been given for explanatory purposes, from a production standpoint, it has been found difficult to produce components having consistent characteristics within the tolerances necessary for obtaining accurate measurement readings. Thus, for example, the probe Q may vary and the natural resonant frequency of the probe in air may vary. It has, however, been found that with a given probe having a given natural resonant frequency in air, a predetermined natural resonant frequency differential exists when that probe is immersed in a petroleum product. It also follows, for practical purposes, that a given capacitance connected across the inductance loop 31 will produce this frequency differential between the resonance of the probe in air and petroleum product. From a practical manufacturing standpoint, it has been found preferable to tune the output of the oscillator 28 to a "standard" probe in air by adjusting the condenser 144. The standard probe is assumed to have a resonant frequency in air of 163 mc. and a return signal of 32 volts, as indicated in FIG. 8. Immersed in product in a level sensing position, the "standard" probe would have a natural frequency of 161 mc. and an amplified return signal of 16 volts. The probe is then fully immersed in the petroleum product and the condenser 76' is connected across loop 31 and adjusted to accurately give a first signal of 158 mc. This being the natural frequency of the probe in product. The condenser 76' is then locked and become a fixed value which gives the desired frequency differential in a very accurate manner.

When installed in the field, it is of course necessary that there be interchangeability of probes. Thus, when an installation is made, the first signal must be adjusted so that it is certain to be tuned to the natural resonant frequently of the probe being used. Commercial manufacturing tolerances might produce a probe having a natural resonant frequency of 164 mc. in air. The condenser 144 can be adjusted to obtain the desired resonant qualities so that the first signal will be 164 mc. A probe with a resonant frequency of 164 mc. in air will have a natural resonant frequency of 159 mc. in petroleum product. Thus, within a fair range of limits the same capacitance value accurately obtained for the condenser 144 will provide the desired frequency shift so that the first signal will be resonant with any probe in air and automatically be resonant with that same probe when it is immersed in product.

All of the above leads to more accurate and inexpensive measurement of liquid levels and particularly provides the improvement of enabling the use of a single probe to accurately determine the levels of the upper and lower surfaces of a body of liquid.

The present application is a continuation in part of my copending application Serial No. 790,873, filed February 3, 1959, now abandoned.

Having thus described the invention, what is claimed is novel and desired to be secured by Letters Patent of the U.S. is:

1. Electronic liquid level sensing apparatus comprising a probe for tracking liquid surfaces, means for generating a high frequency first signal and transmitting it to said probe, said probe being electrically resonant at a frequency approximating the first signal with its resonant frequency variable in accordance with its positional relation to the liquid surfaces, means for establishing a predetermined relation between the probe and the upper liquid surface in response to the resonant frequency of said probe being varied to a given frequency other than the frequency of said first signal, means for incrementally changing the frequency of said first signal so that a predetermined relation is established between the probe and the lower surface of the liquid upon the resonant frequency of the probe attaining a given value reflected by a change in the resonant frequency of the probe in said predetermined relation to the lower liquid surface.

2. Apparatus as in claim 1 wherein the probe comprises an exposed, metal, disk-like element at its lower end for creating a capacitance effect with the material defining the lower surface of the liquid to space the probe above the lower liquid surface in said predetermined relation thereto.

3. Electronic liquid level sensing apparatus for detecting the lower surface of a liquid defined by a material having a relatively higher conductivity than the liquid, said apparatus comprising a probe for tracking the lower surface of the liquid, means for generating a high frequency first signal and transmitting it to said probe, said probe being electrically resonant at a frequency approximating the first signal with its resonant frequency variable in accordance with its positional relation to the lower liquid surface, means for establishing a predetermined relation between the probe and the lower liquid surface in response to the resonant frequency of said probe being varied to a given frequency other than the frequency of the first signal, said probe comprising an exposed, metal, disk-like element for creating a capacitance effect with the material defining the lower surface of the liquid to space the probe above the lower liquid surface in said predetermined relation thereto.

4. Electronic liquid level measuring apparatus for determining the heights of two bodies of immiscible liquids lying one on top of the other and delineated by an interface therebetween, said apparatus comprising a probe, servomotor control means for raising and lowering said probe, means remote from said probe for generating a high frequency modulated first signal, means for transmitting said first signal to said probe, said probe comprising a wire on which is developed a second modulated high frequency signal, said probe further comprising means for deriving a low frequency return signal from and proportional to said second signal, said second signal being dependent on the capacitance-inductance characteristics created by the positional relation of the probe to the liquid, means for transmitting said return signal to said servomotor control means, said servomotor control means being operative to maintain the probe in predetermined relation with the upper surface of the upper liquid in response to a return signal of intermediate strength, means for incrementally changing the frequency of the first signal so that the return signal is varied to cause the servomotor control means to lower the probe toward the interface, said return signal returning to said intermediate strength when in predetermined relation with said interface, thereby maintaining said probe in an interface sensing position.

5. Electronic liquid level measuring apparatus for determining the heights of two bodies of immiscible liquids lying one on top of the other and delineated by an interface therebetween, said apparatus comprising a probe, servomotor control means for raising and lowering said probe, means remote from said probe for generating a high frequency modulated first signal, means for transmitting said first signal to said probe, said probe comprising a wire on which is developed a second modulated high frequency signal, said probe further comprising means for deriving a low frequency return signal from and proportional to said second signal, said second signal being dependent on the capacitance-inductance characteristics created by the positional relation of the probe to the liquid, means for transmitting said return signal to said servomotor control means, said servomotor control means being operative to maintain the probe in predetermined relation with the upper surface of the upper liquid in response to a return signal of intermediate strength, means for changing the frequency of the first signal so that the return signal is varied to cause the servomotor control means to lower the probe toward the interface, said wire having an exposed, metal, disk on its lower end whereby a capacitance effect is created when the disk is spaced a fixed distance above the interface, said return signal returning to said intermediate strength when in predetermined relation with said interface, thereby maintaining said probe in an interface sensing position.

6. Electronic liquid level measuring apparatus for determining the heights of two bodies of immiscible liquid lying one on top of the other in a container, said apparatus comprising a surface seeking probe, control means for said probe mounted exteriorly of said container, said control means including a servomotor, a mechanical connection between said servomotor and said probe arranged to raise and lower the probe in response to operation of the servomotor, said control means further including means for generating a high frequency modulated first signal, cable means for transmitting said modulated signal to said probe, said probe including a shielded wire resonant in air at said high frequency, means for coupling said modulated signal to said wire to develop a second modulated signal, means for detecting the modulated component of said second signal to derive a return signal, means for transmitting the return signal to said control means, means operative in response to the strength of said return signal for actuating said servomotor to immerse said resonant wire to a depth in said liquid such that its resonant frequency is slightly lower than the frequency of the first signal; said last named means stopping rotation of said servomotor when the strength of the return signal is at an intermediate level, thus bringing the probe to a predetermined relation relative to the upper surface of said one liquid, and means for incrementally lowering the frequency of said generating means by an amount which is insufficient to reduce the strength of said return signal below said predetermined level whereby said servomotor will be actuated to lower said probe into said first liquid so that it will approach the interface between the two bodies of liquid and whereby the resonant wire will be further detuned as it is brought into close proximity with said interface and upon reaching a predetermined position relative to said interface, the return signal again reverts to said predetermined level and the servomotor stops with the probe in fixed relation relative to said interface.

7. Apparatus as in claim 6 wherein the probe comprises a metal cylinder for shielding said wire and an exposed, metal, disk is affixed to the lower end of said wire and spaced a short distance from the lower end of said cylinder to obtain a capacitance effect between the disk and the interface for detuning the wire so that the probe is spaced above the interface in its interface sensing position.

8. Apparatus as in claim 7 wherein the metal cylinder is filled with a dielectric material from top to bottom.

9. Apparatus as in claim 6 wherein the servomotor is a two-phase induction motor having a pair of coils, one of which is electrically 90° out of phase with the other, one end of one coil being electrically joined to the one end of the other coil, and the means for actuating the servomotor includes a comparator to which is fed the return signal as well as a reference signal and means for transmitting the resultant of said signals to one winding of the servomotor and wherein means are provided for eliminating the effect of the reference signal so that the servomotor rotates to lower the probe from its upper level sensing position when the strength of the return signal is relatively weak due to adverse operating conditions.

10. Apparatus as in claim 9 wherein the means for eliminating the effect of the reference signal comprises a condenser and a relay for temporarily connecting the condenser across the other ends of the coils of the servomotor to convert it to a single phase capacitor motor operable to lower the probe.

11. Apparatus as in claim 6 wherein the first signal generating means comprises an oscillator having a tank circuit and wherein the means for shifting the frequency of the first signal comprises a condenser and a relay operable to connect said condenser across said tank circuit.

12. Apparatus as in claim 11 wherein the relay is operable from a point remote from the first signal generator.

13. Electronic liquid level measuring apparatus for determining the heights of two bodies of immiscible liquid lying one on top of the other in a container, said apparatus comprising a surface seeking probe, control means for said probe mounted exteriorly of said container, said control means including a servomotor, a mechanical connection between said servomotor and said probe arranged to raise and lower the probe in response to the operation of the servomotor, said control means further including means for generating a high frequency modulated first signal, cable means for transmitting said modulated signal to said probe, said probe including a shielded wire resonant in air at said high frequency, said probe further comprising a cylindrical shell for shielding said wire with the wire exposed and projecting a short distance therebelow, means for sealing off the interior of said shell whereby the resonant frequency of the probe will be lowered by contact of the wire with the upper surface of the liquid and once the exposed portion of the wire is completely immersed in the liquid, the resonant frequency of the probe will be a fixed value, means for coupling said modulated signal to said wire to develop a second modulated signal thereon, means for detecting the modulated component of said second signal to derive a return signal, means for transmitting the return signal to said control means by way of said cable means, means operative in response to the strength of said return signal being above a given level for actuating said servomotor to immerse the exposed portion of said wire to a depth intermediate its length such that its resonant frequency is slightly lower than the frequency of the first signal, said last named means stopping operation of said servomotor when the strength of the return signal is at said given level thus bringing the probe to a predetermined relation relative to the upper surface of said one liquid, and means for incrementally decreasing the frequency of said first signal an amount which is sufficient to increase the strength of said return signal above said given level, whereby said servomotor will be actuated to lower said probe into said first liquid so that it will approach the interface between the two bodies of liquid and whereby the resonant wire will be further detuned as it is brought into close proximity with said interface, and upon reaching a predetermined position relative to said interface, the resonant frequency of said probe is further decreased so that the return signal again reverts to said given level and the servomotor stops with the probe in fixed relations relative to said interface.

14. Apparatus as in claim 13 wherein the frequency of the first signal is decreased to a value slightly higher than the resonant frequency of the probe when the exposed wire is fully immersed in said one liquid.

15. Apparatus as in claim 13 wherein the means operative in response to said control means comprises a reference signal opposing said return signal and wherein means are provided for temporarily eliminating the effect of said reference signal to insure immersion of the probe in said one liquid and further wherein the first signal is decreased to the resonant frequency of the probe when fully immersed in said one liquid.

16. Electronic liquid level measuring apparatus for determining the heights of two bodies of immiscible liquids lying one on top of the other and delineated by an interface therebetween, said apparatus comprising a probe, servomotor control means for raising and lowering said probe, means remote from said probe for generating a high frequency modulated first signal, means for transmitting said first signal to said probe, said probe having a wire which in air is electrically resonant with said first signal and on which is developed a modulated high frequency second signal, said probe further comprising means for deriving a low frequency return signal from and proportional to said second signal, said second signal being decreased as the lower end of said wire approaches and contacts the upper surface of said one liquid and the natural frequency of the wire decreases, means for transmitting said return signal to said servomotor control means, said control means including means for amplifying said return signal, said control means being operative to maintain said probe at rest in predetermined relation with the upper surface of said one liquid in response to an amplified return signal of a given intermediate level, said control means being operative to lower said probe in response to an amplified return signal above said given level and raise the probe in response to an amplified return signal below said given level, means for shifting the frequency of said wire and automatically increasing the amplification factor of said amplifying means by an amount sufficient to produce an amplified return signal above said given level for a predetermined time sufficient to fully immerse said wire in said one liquid and then reverting the amplifying means to its usual amplification factor when the generating means is fully immersed in said one liquid.

17. Apparatus as in claim 16 wherein the first signal generating means comprises an inductance loop and characterized in that frequency shifting means comprise a detuning condenser and a relay for connecting said condenser across said loop.

18. Apparatus as in claim 16 wherein a variable condenser is connected across said loop so that the first signal may be accurately adjusted to the resonant frequency of any given probe in air and said detuning condenser is also variable whereby the required capacitance value for shifting the frequency of the first signal to the resonant frequency of any given probe in said one liquid may be accurately obtained.

19. Apparatus as in claim 17 wherein the means for increasing the amplification factor comprise an electronic timing circuit.

20. Apparatus as in claim 19 wherein the amplifying means comprise a preamplifier including an electron tube having a cathode biasing resistor connected to ground, means for feeding a degenerative signal through said resistor and wherein the timing circuit is characterized by a path for by-passing the degenerative signal around the cathode resistor, said path including a resistor connected to the cathode and a semi-conductor connected in series therewith to ground whereby the amplification is increased while the degenerative signal is by-passed.

21. Apparatus as in claim 20 characterized in that said path includes switch contact controlled by said relay and closed in response to energization of the relay to connect said detuning condenser across said inductance loop.

22. A timing circuit for providing a controlled and limited period of increased amplification in an electron tube amplifying circuit comprising a cathode biasing resistor connected to ground and means for feeding a degenerative signal to said resistor, said timing circuit comprising an alternate path for by-passing said degenerative signal around said resistor to ground and including a condenser connected to the cathode of said electron tube and a semi-conductor connected in series with said condenser to ground and a resistor connected in parallel across said condenser and means for opening and closing said alternate path.

(References on following page)

References Cited in the file of this patent

UNITED STATES PATENTS

| | | |
|---|---|---|
| 2,034,226 | Carter | Mar. 17, 1936 |
| 2,188,671 | Wilson | Jan. 30, 1940 |
| 2,215,777 | Benz | Sept. 24, 1940 |
| 2,484,573 | Kezer | Oct. 11, 1949 |
| 2,523,363 | Gehman | Sept. 26, 1950 |
| 2,601,060 | Runaldue | June 17, 1952 |
| 2,619,620 | Tapp et al. | Nov. 25, 1952 |
| 2,682,026 | Mesh et al. | June 22, 1954 |
| 2,812,485 | Shieber | Nov. 5, 1957 |
| 2,812,928 | Mesh et al. | Nov. 12, 1957 |
| 2,832,924 | Cilyo | Apr. 29, 1958 |
| 2,836,739 | Mesh | May 27, 1958 |

FOREIGN PATENTS

| | | |
|---|---|---|
| 653,099 | Great Britain | May 9, 1951 |

UNITED STATES PATENT OFFICE

CERTIFICATE OF CORRECTION

Patent No. 3,062,994                          November 6, 1962

Theodore J. Mesh

It is hereby certified that error appears in the above numbered patent requiring correction and that the said Letters Patent should read as corrected below.

Column 16, line 26, for "wire" read -- generating means --; line 32, for "generating means" read -- wire --.

Signed and sealed this 7th day of April 1964.

(SEAL)
Attest:

ERNEST W. SWIDER

Attesting Officer

EDWARD J. BRENNER

Commissioner of Patents